United States Patent Office 3,456,010
Patented July 15, 1969

3,456,010
CHLORO-HYDROXY-POLYFLUOROCYCLO-
ALKENONES
Frederic Houghton Megson, Bridgewater Township,
Somerset County, Michael Thomas Beachem,
Franklin Township, Somerset County, and Richard
Frederick Stockel, Bridgewater Township, Somer-
set County, N.J., assignors to American Cyanamid
Company, Stamford, Conn., a corporation of
Maine
No Drawing. Continuation-in-part of application Ser. No.
621,457, Mar. 8, 1967, which is a continuation-in-part
of application Ser. No. 383,244, July 16, 1964. This
application Jan. 18, 1968, Ser. No. 698,732
Int. Cl. C07c 87/30, 85/06; C07d 33/32
U.S. Cl. 260—567.6           10 Claims

ABSTRACT OF THE DISCLOSURE

This invention relates to a novel class of halohydroxy-polyfluorocycloalkenones of the formula:

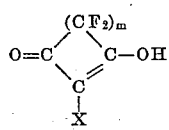

wherein X is selected from the group consisting of chlorine and fluorine, $m$ is 2 or 3, and the metal, amine and quaternary ammonium salts of said polyfluorocycloalkenones. The invention further relates to processes of preparing these compounds.

---

This application is a continuation-in-part of application Ser. No. 383,244, filed July 16, 1964 and application Ser. No. 621,457, filed Mar. 8, 1967, the latter being a continuation-in-part of application Ser. No. 383,223, filed July 16, 1964. All three of these applications are now abandoned.

This invention relates to a novel class of compounds, and more particularly it relates to halo-hydroxy-polyfluorocycloalkenones.

Specifically, the novel compounds of this invention are halo-hydroxy-polyfluorocycloalkenones of the formula

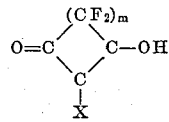   I wherein X is selected from the group consisting of chlorine and fluorine, $m$ is 2 or 3, and the metal, amine and quaternary ammonium salts of said polyfluorocycloalkenones.

Further, the invention relates to a general process for obtaining compounds of the formula:

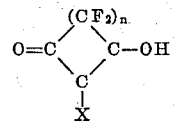   II wherein X is selected from the group consisting of chlorine and fluorine, $n$ is 1, 2 or 3, and to the metal, amine and quaternary ammonium salts of said polyfluorocycloalkenones.

It will be seen by comparing Formulas I and II above that the novel compounds are limited to 5- and 6-membered ring systems, while the novel processes of this invention relates to 4-, 5- and 6-membered ring systems.

Referring to Formula II, the ring systems there typified include the following:

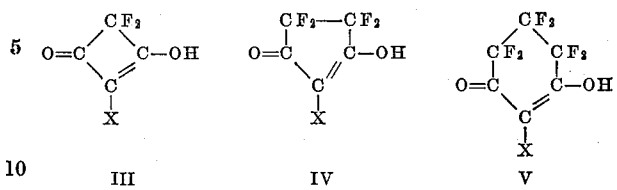

In Formulas III, IV and V above, X is selected from the group consisting of chlorine and fluorine. The compounds of Formula III may be designated 2-halo-3-hydroxy - 4,4 - difluoro - 2 - cyclobuten - 1 - ones; the compounds of Formula IV may be designated 2 - halo - 3 - hydroxy - 4,4,5,5 - tetrafluoro - 2 - cyclopenten - 1 ones; while the compounds of Formula V may be designated as 2 - halo - 3 - hydroxy - 4,4,5,5,6,6 - hexafluoro - 2 - cyclohexen - 1 - ones.

The metal salts of the above-described cycloalkenones, to our knowledge, include salts of all metals. Thus, the metal salts refer to all elements of the periodic chart except those classified as non-metals or inert gases, and illustratively include lithium, sodium, potassium, rubidium, beryllium, magnesium, calcium, strontium, barium, zirconium, titanium, vanadium, chromium, molybdenum, manganese, iron, cobalt, nickel, palladium, platinum, copper, silver, gold, zinc, cadmium, mercury, aluminum, tin, lead, antimony, bismuth, and the like.

Alkali metal, alkaline earth metal and quaternary ammonium salts of Formulas I and II may be obtained when compounds of the formula

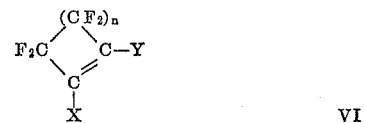   VI wherein X is selected from the group consisting of chlorine and fluorine, Y is selected from the group consisting of chlorine, fluorine, aryloxy, and lower alkoxy, wherein the alkyl group contains from 1 to 4 carbon atoms and $n$ is 1, 2, or 3, are reacted with alkali metal hydroxides, alkaline earth metal hydroxides, and quaternary ammonium hydroxides in selected solvents, and usually in the presence of small amounts of water.

Typical compounds contemplated by Formula VI hereinabove include the following: perfluorocyclobutene, 1,2-dichloro - 3,3,4,4 - tetrafluoro - 1 - cyclobutene, perfluorocyclopentene, 1,2 - dichloro - 3,3,4,4,5,5 - hexafluoro - 1 - cyclopentene, 1 - chloro - 2 - methoxy - 3,3,4,4, 5,5 - hexafluoro - 1 - cyclopentene, 1,2 - dichloro - 3,3,4, 4,5,5,6,6 - octafluoro - 1 - cyclohexene, 1 - chloro - 2,3,3, 4,4 - pentafluoro - 1 - cyclobutene, 1 - chloro-2,3,3,4,4,5,5-heptafluoro - 1 - cyclopentene, 1 - chloro - 2,3,3,4,4,5, 5,6,6 - nonafluoro - 1 - cyclohexene, perfluorocyclohexene, 1 - chloro - 2 - phenoxy - 3,3,4,4,5,5 - hexafluoro - 1-cyclopentene, and the like.

Typical alkali metal hydroxides include sodium hydroxide, potassium hydroxide, lithium hydroxide, rubidium hydroxide; while the alkaline earth metal hydroxides are typified by magnesium hydroxide, barium hydroxide, calcium hydroxide, and strontium hydroxide. The quaternary ammonium hydroxides are typified by tetraalkyl ammonium hydroxides, such as tetramethylammonium hydroxide, tetraethylammonium hydroxide, diethyldipropylammonium hydroxide, butyltrimethylammonium hydroxide, tetrabutylammonium hydroxide, and the like. Also, mixed tetra(alkyl-aralkyl)ammonium hydroxides such as benzyltrimethylammonium hydroxide, benzyltriethylammonium hydroxide, dibenzyldimethylammonium hydroxide, and 1-methylpyridinium hydroxide are contemplated.

As noted above, the reactions are carried out in the presence of selected solvents, the choice of which has been determined to be critical. In carrying out the processes of this invention, we have determined that the solvent should be selected from two classes. Included in the first class are the aprotic dipolar solvents such as dimethylformamide, dimethyl sulfoxide, 1-methyl-2-pyrrolidinone, dimethylacetamide, acetonitrile, sulfolane, acetone, benzonitrile, nitrobenzene and nitromethane. The second class of solvents includes diglyme, i.e., the dimethyl ether of diethylene glycol, the diethyl ether of ethylene glycol, and tetrahydrofuran.

In carrying out the reaction, the strong alkali, i.e., the alkali metal hydroxide, alkaline earth metal hydroxide or quaternary ammonium hydroxide, is employed usually in amounts of from between 3 and 5 equivalents per mole of the olefin of Formula VI above. Theoretically, at least 4 equivalents are required and preferably amounts from between 4 and 4.2 equivalents are utilized.

The reaction may be carried out at atmospheric, subatmospheric and superatmospheric pressures. At atmospheric pressures, the reaction is normally carried out at temperatures of from between 0 and 100° C. and preferably at from about 30 to 70° C. The time of reaction depends upon the reactants and the temperatures employed and is continued until the alkali is no longer consumed or until a pH of substantially 7 is achieved.

The compounds of Formula II above, which are the hydrogen or free acid forms, are obtainable from the alkali metal, alkaline earth metal and quaternary ammonium salts by acidifying with a mineral acid or by contacting the salts with a hydrogen ion form of an ion exchange resin. Suitable ion exchange resins include phenolsulfonic acid cation-exchange resins, such as those obtained by reacting an aldehyde, a phenol and a sulfonic acid or a sulfite, and sulfonated vinyl polymerization products, such as sulfonated styrene-divinylbenzene copolymers. In general, the cation-exchange resins are polymeric materials containing sulfonic, carboxylic, phosphonic and/or phenolic groups. Contact between the salts of the compounds of Formula II and the ion exchange resins can be made in aqueous or non-aqueous mediums.

The metal salts may be obtained by reacting the acids of Formula II with a metal hydroxide, oxide or salt of a weaker acid. The amine salts may be obtained by reacting the acid with an amine or an amine salt of a weaker acid. Quaternary ammonium salts can be obtained by reacting the acid with a quaternary ammonium hydroxide or with a quaternary ammonium salt of a weaker acid.

The alkali metal, alkaline earth metal and quaternary ammonium salts can be converted to other salts by a metathetical reaction of the said salts in aqueous medium with a water-soluble metal salt, amine salt or quaternary ammonium salt. The desired salt of Formula II is less soluble in water than the starting material.

A still further method of preparing dialkylamine salts of compounds of Formula II involves reacting compounds of Formula VI at elevated temperatures in a dialkylformamide with hydrogen halide or alkali halides in the presence of small amounts of water. Suitable hydrogen halides include hydrogen fluoride, hydrogen iodide, hydrogen bromide, and hydrogen chloride. Suitable alkali halides that may be employed are potassium fluoride, sodium iodide, potassium bromide, sodium chloride, and the like.

Reaction temperatures of at least 100° and preferably at least 140° C. are required for a reaction of this type. The product is the di-lower alkylamine salt corresponding to the dialkylformamide employed.

Certain quaternary ammonium salts of compounds of Formula II, namely, salts of Formula VIII, can be obtained by a process in which the quaternary ammonium salts of Formula VII are intermediate products.

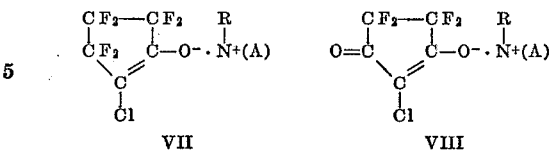

VII VIII

In Formulas VII and VIII, R is a linear lower alkyl group containing from 1 to 4 carbon atoms and N(A) is selected from the group consisting of a trialkyl amine and quinoline. The alkyl groups of A, where N(A) is a trialkyl amine, contemplated by this invention are those containing from 1 to 22 carbon atoms; these alkyl groups can contain inert substituents such as hydroxy, alkoxy or acyloxy.

The quaternary salts of Formula VII above may be prepared by contacting a 1-chloro-2-alkoxy-3,3,4,4,5,5-hexafluoro-1-cyclopentene, compounds of the Formula IX,

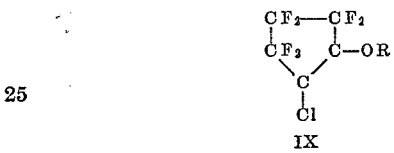

IX wherein R is a linear lower alkyl radical, with the corresponding tertiary amine.

The quaternary salts of Formula VIII above are prepared by reacting or hydrolyzing the compounds of Formula VII with water.

The preferred 1-chloro-2-alkoxy-3,3,4,4,5,5-hexafluoro-1-cyclopentene is 1-chloro-2-methoxy-3,3,4,4,5,5-hexafluoro-1-cyclopentene, which may be obtained by the procedure disclosed in J. Indian Chem. Soc. 30, 809 (1953).

Suitable tertiary amines that may be employed include trialkyl amines, such as trimethylamine, triethylamine, tri-N-propylamine, methyldioctadecylamine, and the like; substituted trialkyl amines include hydroxy-substituted trialkyl amines, such as dimethylaminoethanol, diethylaminoethanol, and the like; alkoxy-substituted trialkyl amines such as methoxyethyldimethylamine, and the like; acyloxy-substituted trialkyl amines, such as dimethylaminoethyl acetate, dimethylaminoethyl propionate, dimethylaminoethyl acrylate, dimethylaminoethyl methacrylate diethylaminoethyl acrylate, and the like; and quinoline.

As indicated above, the quaternary salts of Formula VIII may be prepared by reacting the salts of Formula VII with water. In a preferred procedure for preparing the salts of Formula VIII, a 1-chloro-2-alkoxy-3,3,4,4,5,5-hexafluoro-1-cyclopentene, a tertiary amine, a mixture of water and a water-miscible solvent for the cyclopentene, and an acid binder, such as, for example, sodium carbonate, are reacted until the quaternary salt is formed.

In an alternate procedure, a suitable 1-chloro-2-alkoxy-3,3,4,4,5,5-hexafluoro-1-cyclopentene and an excess of a tertiary amine are mixed, without other solvent, and the hexafluoro quaternary salt of Formula VII above is obtained, which is then hydrolyzed with water to produce the quaternary salts of Formula VIII.

In the preferred procedure, at least one mole of tertiary amine per mole of the cyclopentene is employed, though an excess normally on the order of 5 to 10% is preferred. Larger amounts are unnecessary, but may be employed if desired.

The reactions between the cyclopentenes and tertiary amines may be carried out at atmospheric, subatmospheric or superatmospheric pressures. At atmospheric pressures, reaction temperatures of from about 15 to about 80° C. are employed.

The reaction is carried out to completion, the time of which is dependent upon the reactants, reaction temperature, pressure, and preferably is continued until the characteristic infrared absorption band of the starting cyclopentene is no longer detectable.

The salts may be recovered and isolated by conventional means from their reaction mediums, including filtration or centrifuging.

The tertiary amines which react with the compounds of Formula IX, as described above, to give the quaternary salts of Formula VII belong to the class of nucleophilic compounds called "hindered" because the substituents on the nucleophilic nitrogen atom are very bulky. "Non-hindered" tertiary amines when treated with approximately equivalent amounts of compounds of Formula IX, alone or in the presence of solvents of high polarity, generally give betaines. The quaternary salts VII can be prepared from non-hindered tertiary amines by diluting the reactants with at least five parts by volume, preferably at least 10 parts, of an aprotic solvent of moderate to low polarity per part of amine. Suitable non-hindered tertiary amines include pyridine, 3- and 4-methoxypyridine, 3- and 4-methylthiopyridine, nicotinamide, isonicotinamide, 3- and 4-ethoxycarbonylpyridine, isoquinoline, 4-methoxyisoquinoline, 4-methylthioisoquinoline, 4-carbamoylisoquinoline, and 4 - methoxycarbonylisoquinoline. Suitable solvents of moderate to low polarity include nitromethane, nitrobenzene, ether, diglyme, acetone, ethyl acetate, benzene, and methylene chloride.

The quaternary ammonium salts of Formula VII above have been found to be moisture-sensitive highly reactive solids, while the quaternary ammonium salts of Formula VIII are colorless crystalline solids, soluble in water and soluble in hot ethyl acetate.

The compounds of this invention have demonstrated antifungal activity against trichopyton mentagrophytes, microsporum gypseum and chaetomium globosum.

Further, they are outstandingly strong acids. The acids of the 5- and 6-membered rings of Formula I, the novel compounds of this invention, are markably stronger acids than those of the corresponding 4-membered ring compounds. The acids of the 5- and 6-membered rings are believe to be fully as strong as perchloric acid, their relative acid strengths may only be obtained by a nonaqueous titration.

It is particularly noteworthy that the strong acids are completely miscible in solvents such as water and diethyl ether. Thus, they may be employed as catalysts in solvents covering a wide range of polarity.

It is interesting to note that the addition of sulfuric acid to aqueous solutions of the 5- and 6-membered ring acid products of this invention did not result in a change in their ultraviolet spectrum. The implication is that these compounds are completely dissociated, even in the presence of sulfuric acid.

In addition to the greater acid strength of the novel 5- and 6-membered ring compounds of this invention relative to the 4-membered ring systems, the 4-membered systems are more deliquescent and more difficultly soluble in organic solvents than the compounds of this invention. Thus, the utility of the compounds of this invention in systems which require high acidity and greater solubility in a wide range of solvents is evident. Moreover, some of the metal salts of this invention can serve as catalysts for cross-linking reactants to impart crease resistance and shrinkage control to such substrates as cellulosic textile materials.

The quaternary ammonium salts of this invention, such as those of Formula VII, are useful as chemical intermediates and as catalysts for curing aminoplast on textile material, to impart wrinkle resistance thereto.

The quaternary salts of Formula VIII are useful as catalysts or accelerators in the curing of aminoplast resins of the type employed to impart wrinkle recovery and shrinkage control to cellulosic textile fabrics.

In order to illustrate the present invention, the following examples are given primarily by way of illustration. All parts and percentages are by weight unless otherwise specifically designated.

EXAMPLE 1

2-chloro-3-hydroxy-4,4,5,5-tetrafluoro-2-cyclopenten-1-one, potassium salt

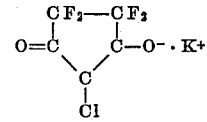

A reaction mixture containing 73.5 parts of 1,2-dichloro-3,3,4,4,5,5-hexafluoro-1-cyclopentene, 250 parts of diglyme, 19.3 parts of powdered potassium hydroxide and 3.5 parts of water was heated at 60° C. while vigorously stirring for about 4 hours. The reaction mixture was then cooled and the inorganic salts were seperated by filtration. Evaporation of the solvent yielded about 65 parts of desired product (89% of theory).

EXAMPLE 2

2-chloro-3-hydroxy-4,4,5,5-tetrafluoro-2-cyclopenten-1-one, potassium salt

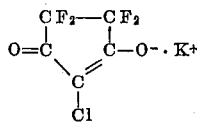

A reaction mixture containing 24.1 parts of 1-chloro-2-methoxy-3,3,4,4,5,5-hexafluoro-1-cyclopentene, 75 parts of glyme, 23.2 parts of potassium hydroxide and about 5 parts of water was heated at 50° C. for about 15 hours. The desired product was obtained by cooling the reaction mixture, filtering off the inorganic salts and evaporating the solvent.

EXAMPLE 3

2-chloro-3-hydroxy-4,4,5,5-tetrafluoro-2-cyclopenten-1-one, calcium salt

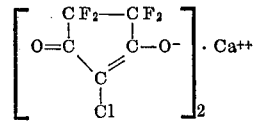

To a mixture of 150 parts of diethyl ether of ethylene glycol and 29.6 parts of calcium hydroxide at 50° C. there was added 49 parts of 1,2-dichloro-3,3,4,4,5,5-hexafluoro-1-cyclopentene. After the reaction mixture was heated for about 24 hours, the product was obtained by cooling the reaction mixture, filtering off the inorganic salts and evaporating the solvent.

EXAMPLE 4

2-chloro-3-hydroxy-4,4,5,5-tetrafluoro-2-cyclopenten-1-one, zinc salt

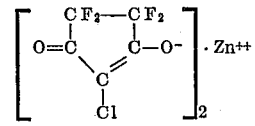

A solution of 13.8 parts of the potassium salt of 2-chloro-3-hydroxy-4,4,5,5 - tetrafluoro-2-cyclopenten-1-one (product of Examples 1 and 2) and 4.08 parts of zinc chloride in 25 parts of water was refluxed for about 3 hours. Evaporation of the resulting solution to a volume equivalent to about 10 parts of water followed by cooling and filtration yielded the desired zinc salt.

EXAMPLE 5

3-hydroxy-2,4,4,5,5-pentafluoro-2-cyclopenten-1-one, potassium derivative

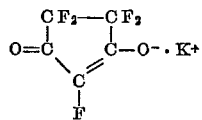

The reaction mixture of 50 of parts of diglyme, 10.6 parts of perfluorocyclopentene, 11.3 parts of potassium hydroxide and 2.0 parts of water was heated in a sealed glass tube under pressure at 75° C. for about 24 hours. The inorganic salts were removed from the reaction mixture by filtration, and the solvent was then removed by vacuum distillation. The residue comprised the product (9.7 parts).

EXAMPLE 6

2-chloro-3-hydroxy-4,4,5,5,6,6-hexafluoro-2-cyclohexen-1-one, potassium salt

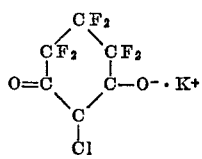

To about 200 parts of diglyme at 50° C. there was added 19.3 parts of potassium hydroxide, 3.5 parts of water and 25 parts of 1,2-dichloro-3,3,4,4,5,5,6,6-octafluoro-1-cyclohexene over one-half hour. After 3 hours at a temperature of about 50° C. the reaction mixture was cooled, the inorganic salts were separated by filtration and the solvent was evaporated. The residue was the desired product.

EXAMPLE 7

2-chloro-3-hydroxy-4,4-difluoro-2-cyclobuten-1-one, potassium salt

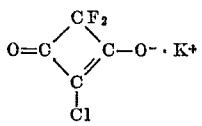

A mixture of 9.7 parts of 1,2-dichloro-3,3,4,4-tetrafluoro-1-cyclobutene, 60 parts of diglyme, 11.3 parts of potassium hydroxide and 2.0 parts of water was heated in a sealed container at 75° for 24 hours. The reaction mixture was cooled, the inorganic salts were filtered off, and the solvent was evaporated. The desired product was obtained by recrystallizing the residue from isopropanol.

EXAMPLE 8

3-hydroxy-2,4,4-trifluoro-2-cyclobuten-1-one, potassium salt

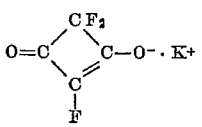

A mixture of 20 parts of perfluoro-1-cyclobutene, 23.7 parts of potassium hydroxide, about 4.3 parts of water and 60 parts of diglyme was heated at 50° C. for 24 hours in a sealed container with an atmosphere of nitrogen. The reaction mixture was filtered to remove inorganic salts and the salts were washed with isopropanol. The solvents were then removed by distillation of the combined digyme and isopropanol fractions. The desired product was obtained by recrystallization of the residue from an isobutanol-ether mixture.

EXAMPLE 9

2-chloro-3-hydroxy-4,4,5,5-tetrafluoro-2-cyclopenten-1-one, tetramethylammonium salt

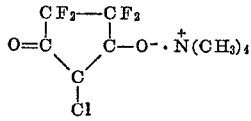

To a mixture of 175 parts of diethyl ether of ethylene glycol and 25 parts of tetramethylammonium hydroxide at 40° C. there was added 17 parts of 1,2-dichloro-3,3,4,4,5,5-hexafluoro-1-cyclopentene over about 0.5 hour. The reaction mixture was heated at 50° for about 24 hours. After cooling, the liquid layer was decanted from the solids, and evaporated to dryness. The residue was the desired product.

EXAMPLE 10

2-chloro-3-hydroxy-4,4,5,5-tetrafluoro-2-cyclopenten-1-one, dimethylammonium salt

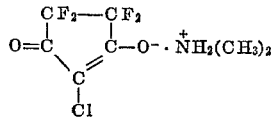

A mixture of 300 parts of dimethylformamide, 122.5 parts of 1,2-dichloro-3,3,4,4,5,5-hexafluoro-1-cyclopentene and 180 parts of potassium fluoride dihydrate was heated in a pressure vessel at 140° C. for about 8 hours. After cooling, the reaction mixture was filtered to remove inorganic salts. The residue after evaporation of the solvent was the desired product (61.8% of theory yield).

EXAMPLE 11

2-chloro-3-hydroxy-4,4,5,5-tetrafluoro-2-cyclopenten-1-one-dimethylammonium salt

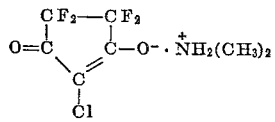

A reaction mixture of 10 parts of 1-chloro-2-methoxy-3,3,4,4,5,5-hexafluoro - 1 - cyclopentene, 15 parts of dimethylformamide, and 11.3 parts of 47% aqueous hydrogen iodide was heated at 140° C. for about 4 hours. After removal of the solvent by evaporation, the residue was recrystallized from isopropanol to give an 81% of theory yield of the desired product.

EXAMPLE 12

2-chloro-3-hydroxy-4,4,5,5-tetrafluoro-2-cyclopentene-1-one, dimethyldioctadecylammonium salt

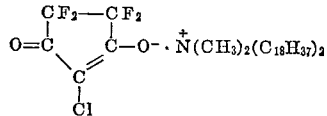

To about 20 parts of dry methanol was added 2.4 parts of 2 - chloro-3-hydroxy-4,4,5,5-tetrafluoro-2-cyclopentene-1-one, potassium salt (0.01 mole) (product of Example 1) and 5.8 parts of dimethyldioctadecylammonium chloride (0.01 mole) at 50° C. The reaction was stirred at this temperature for 15 hours. Upon cooling and adding water (about 25 parts), a white waxy solid separated. Approximately 7 parts of the desired salt was obtained.

EXAMPLE 13

2-fluoro-3-hydroxy-4,4,5,5-tetrafluoro-2-cyclopentene-1-one, dimethyldioctadecylammonium salt

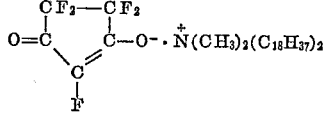

A solution of 1.0 part of the potassium salt of 3-hydroxy-2,4,4,5,5-pentafluoro-2-cyclopenten-1-one (product of Example 5) and 2.57 parts of dimethyldioctadecylammonium chloride in 25 ml. of methanol was stirred at 50° C. for 15 hours. Upon cooling and adding 25 ml. of water, about 3.2 parts of the desired product was obtained as a waxy solid.

EXAMPLE 14

2-chloro-3-hydroxy-4,4,5,5-tetrafluoro-2-cyclopenten-1-one, 1-methylquinolinium salt

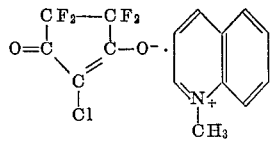

A solution of 1.8 parts of N-methylquinolinium chloride and 2.4 parts of 2-chloro-3-hydroxy-4,4,5,5-tetrafluoro-2-cyclopentene-1-one potassium salt (product of Example 1) in a minimum amount of hot water was stirred at ambient temperature for 5 hours. After the mixture was cooled to 0° C., the desired product was separated by filtration.

EXAMPLE 15

2-chloro-3-hydroxy-4,4,5,5-tetrafluoro-2-cyclopenten-1-one

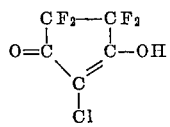

Ten parts of 2-chloro-3-hydroxy-4,4,5,5-tetrafluoro-2-cyclopenten-1-one, potassium salt was dissolved in 75 parts of distilled water. This aqueous solution was eluted through an ion exchange column containing 38 parts (an excess) of a condensation product of p-styrenesulfonic acid and divinylbenzene in acid form.

The resulting acidic solution was concentrated to dryness in vacuo to give 7.9 parts of the acid.

EXAMPLE 16

2-chloro-3-hydroxy-4,4,5,5-tetrafluoro-2-cyclopenten-1-one

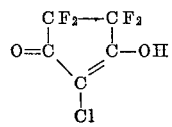

Ten parts of 2-chloro-3-hydroxy-4,4,5,5-tetrafluoro-2-cyclopenten-1-one, potassium salt was added to about 70 parts of dry ethyl ether containing a slurry of 40 parts of a condensation product of p-styrenesulfonic acid and divinylbenzene, product in acid form. The mixture was stirred for 15 hours. Then the exchange resin and unreacted potassium salt were filtered off. The ether was concentrated to dryness to give 8.2 parts of anhydrous acid.

EXAMPLE 17

2-chloro-3-hydroxy-4,4,5,5-tetrafluoro-2-cyclopenten-1-one

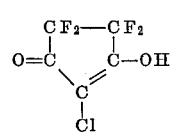

22.5 parts of 2-chloro-3-hydroxy-4,4,5,5-tetrafluoro-2-cyclopenten-1-one, potassium salt (product of Example 1) was added to about 50 parts of tetrahydrofuran. Then the equivalent amount of 30% hydrochloric acid was added (0.093 mole) to precipitate potassium chloride. The potassium chloride was filtered off and the product remained in solution. The product can be isolated by evaporating the organic solvent to obtain 17.4 parts of desired acid.

EXAMPLE 18

2-chloro-3-hydroxy-4,4,5,5-tetrafluoro-2-cyclopenten-1-one, potassium salt

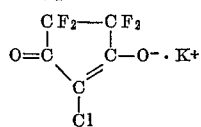

A reaction mixture containing 15.0 parts of 1-chloro-2-phenoxy-3,3,4,4,5,5-hexafluoro-1-cyclopentene, 50 parts of glyme, 11.2 parts of potassium hydroxide and about 2 parts of water was heated at 75° C. for 24 hours. The desired product, 10 parts, was obtained by cooling the reaction mixture, filtering off the inorganic salt and evaporating the solvent.

EXAMPLE 19

2-chloro-3-hydroxy,4,4,5,5,6,6-hexafluoro-2-cyclohexen-1-one

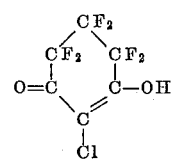

25 parts of 2-chloro-3-hydroxy-4,4,5,5,6,6-hexafluoro-2-cyclohexen-1-one, potassium salt was dissolved in 50 parts of distilled water. This aqueous solution was eluted through an ion-exchange column containing 64 parts (an excess) of a condensation product of p-styrenesulfonic acid and divinylbenzene in acid form.

The resulting acidic solution was concentrated to dryness in vacuo to obtain 56.5 parts of the desired acid.

EXAMPLE 20

1-chloro-2-hydroxy-3,3,4,4,5,5-hexafluoro-1-cyclopentene, 1-methylquinolinium salt

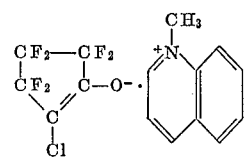

A mixture of 1-chloro-2-methoxy-3,3,4,4,5,5-hexafluoro-1-cyclopentene (21.3 parts, 0.088 mole) and quinoline (57.2 parts, 0.44 mole) was stirred at 25–30° C. for 3 days. Infrared examination of the mixture showed that no unreacted 1-chloro-2-methoxy-3,3,4,4,5,5-hexafluoro-1-cyclopentene remained.

EXAMPLE 21

2-chloro-3-hydroxy-4,4,5,5-tetrafluoro-2-cyclopenten-1-one, 1-methylquinolinium salt

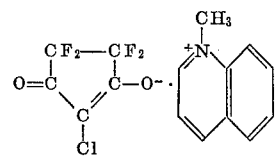

After pouring the product from Example 20 into 500 parts of water, the aqueous layer was decanted from a tarry residue, neutralized with sodium carbonate, and extracted with ether in a continuous extractor. The aqueous phase was clarified at 50–55° C., concentrated and filtered to obtain a dark brown solid. Recrystallization from ethyl acetate yielded a light brown product (12.7 parts, 41% of theory) melting at 103–109° C. Further crystallization from ethyl acetate gave a creamy-white crystalline solid, melting at 105–107° C.

*Analysis.*—Calcd. for $C_{15}H_{10}F_4NO_2Cl$: C, 51.8; H, 2.90; N, 4.03. Found: C, 52.3; H, 3.11; N, 4.60.

EXAMPLE 22

1-chloro-2-hydroxy-3,3,4,4,5,5-hexafluoro-1-cyclopentene, tetramethylammonium salt

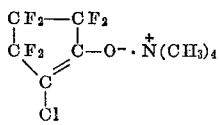

Trimethylamine (60.2 parts, 1.02 moles) was slowly added to 48.2 parts (0.20 mole) of 1-chloro-2-methoxy-3,3,4,4,5,5-hexafluoro-1-cyclopentene while cooling in an ice bath. The maximum temperature was 17° C. After standing several hours, surrounded by an ice bath, the bulk of the excess trimethylamine evaporated and a waxy solid remained.

EXAMPLE 23

2-chloro-3-hydroxy-4,4,5,5-tetrafluoro-2-cyclopenten-1-one, tetramethylammonium salt

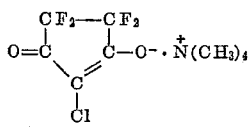

The waxy solid from Example 22 was added to 100 parts of water at 10–15° C. After triturating with water several times, the product was separated by filtration as a colorless solid (18.8 parts) melting at 214–222° C. Concentration of the filtrate and washes gave additional material (26.0 parts) for a total crude yield of 81% of theory. Recrystallization of the product from water gave colorless crystals, melting at 229° C.–231° C.

*Analysis.*—Calcd. for $C_9H_{12}F_4NClO_2$: F, 27.4; Cl, 12.8. Found: F, 26.8; Cl, 13.0.

EXAMPLE 24

2 - chloro - 3 - hydroxy - 4,4,5,5 - tetrafluoro - 2 - cyclopenten - 1 - one, 2 - hydroxyethyltrimethylammonium salt

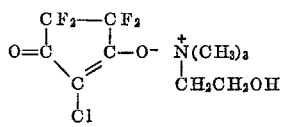

1 - chloro - 2 - methoxy - 3,3,4,4,5,5 - hexafluoro - 1-cyclopentene (45.0 parts, 0.187 mole) was added dropwise to N,N - dimethylaminoethanol (83.4 parts, 0.94 mole) at 50–55° C. After five days at 25–30° C., water (10.1 parts, 0.56 mole) was added to the solution followed by 50% sodium hydroxide (47.2 parts, 0.59 mole) while keeping the temperature between 50–65° C. The resulting slurry was extracted with boiling acetone (2×500 parts) and ethanol (2×350 parts) leaving inorganic salts. The combined extracts were concentrated to obtain sticky crystals (18.0 parts, 55% of theory) which on recrystallization from ethanol gave colorless crystals melting at 104–106° C.

*Analysis.*—Calcd. for $C_{10}H_{14}ClF_4NO_4$: C, 39.0; H, 4.58; Cl, 11.5; F, 24.7; N, 4.56. Found: C, 39.0; H, 4.56; Cl, 11.5; F, 26.5; N, 4.53.

EXAMPLE 25

2 - chloro - 3 - hydroxy - 4,4,5,5 - tetrafluoro - 2 - cyclopenten - 1 - one, 2 - methacryloyloxyethyltrimethylammonium salt

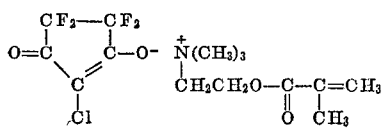

1 - chloro - 2 - methoxy - 3,3,4,4,5,5 - hexafluoro - 1-cyclopentene (96.2 parts, 0.40 mole) was added dropwise at 25–30° C. over a period of 30 minutes to a mixture of N,N-dimethylaminoethyl methacrylate (63.0 parts, 0.40 mole), water (21.6 parts, 1.20 moles), acetone (80 parts) and anhydrous sodium carbonate (44.5 parts, 0.42 mole). Para-methoxyphenol (0.20 part) was added as a polymerization inhibitor. The mixture was stirred at room temperature for 25 hours and filtered to remove inorganic salts. The precipitate was washed with acetone and the combined filtrate and washings were concentrated in vacuo to obtain an almost colorless solid (141.2 parts, 94% of theory). After purification by recrystallization from ethyl acetate, the melting point was 103–105° C.

*Analysis.*—Calcd. for $C_{14}H_{18}ClF_4NO_4$: C, 44.7; H, 4.83; Cl, 9.44; N, 3.74. Found: C, 45.1; H, 5.57; Cl, 9.38; N, 3.67.

EXAMPLE 26

2 - chloro - 3 - hydroxy - 4,4,5,5 - tetrafluoro - 2 - cyclopenten - 1 - one, 2 - methacryloyloxyethyltrimethylammonium salt

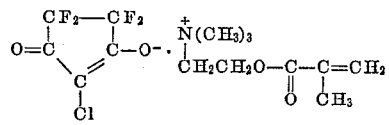

A solution of 1-chloro-2-methoxy-3,3,4,4,5,5-hexafluoro-1-cyclopentene (24.1 parts, 0.10 mole) in N,N-dimethylaminoethyl methacrylate (78.6 parts, 0.50 mole) containing 0.1 part of p-methoxyphenol was stirred at 20–25° C. for 3 days. The reaction mixture was poured into water (300 parts) to give a slurry which was decanted from a small amount of gummy precipitate. The slurry was extracted with ether for 24 hours to remove unreacted amine. The aqueous phase was concentrated to a small volume and the oil was taken up with acetone. This extract was concentrated to give light amber crystals (21.2 parts, 55%). The product had an infrared spectrum essentially identical with that of Example 25.

EXAMPLE 27

2 - chloro - 3 - hydroxy - 4,4,5,5 - tetrafluoro - 2 - cyclopenten - 1 - one, 2 - methacryloyloxyethyltrimethylammonium salt

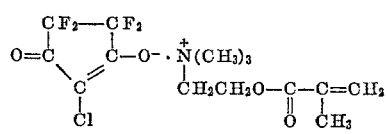

A solution of the potassium salt of 2-chloro-3-hydroxy-4,4,5,5-tetrafluoro-2-cyclopenten-1-one (5.19 parts, .025 mole) and (2-methacryloyloxyethyl)trimethylammonium bromide (6.30 parts, .025 mole) in 100 ml. of isopropanol was refluxed for five hours. After filtering at the boil to remove potassium bromide (2.78 parts, 93% of theory), evaporation of the solvent and recrystallization of the residue gave colorless crystals (3.60 parts, 42% of theory) identical with the product of Example 25.

EXAMPLE 28

1-chloro-2-hydroxy-3,3,4,4,5,5-hexafluoro-1-cyclopentene, 1-methylpyridinium salt

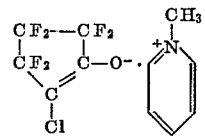

A solution of 48.2 parts (0.20 mole) of 1-chloro-2-methoxy-3,3,4,4,5,5-hexafluoro-1-cyclopentene and 1.58 parts (0.02 mole) of pyridine in 50 parts of diglyme was allowed to stand for several days at room temperature. The solvent and unreacted reagents were removed by distillation in vacuo. A dark red liquid residue was obtained

EXAMPLE 29

2-chloro-3-hydroxy-4,4,5,5-tetrafluoro-2-cyclopenten-1-one, 1-methylpyridinium salt

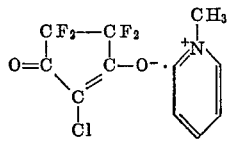

Water 0.75 part) was added to a solution of 1.0 part of the product of Example 28 in 20 parts of acetone. After the mixture had been heated at the reflux temperature for 2–3 minutes, the solvent was allowed to evaporate at room temperature. The crystalline residue was dried and recrystallized to give colorless crystals of the desired product.

Calcd. for $C_{11}H_8F_4O_2NCl$: C, 44.4; H, 2.71; N, 4.71; Cl, 11.9. Found: C, 44.6; H, 2.65; N, 4.68; Cl, 12.0.

EXAMPLE 30

2-chloro-3-hydroxy-4,4,5,5-tetrafluoro-2-cyclopenten-1-one, 1-methylpyridinium salt

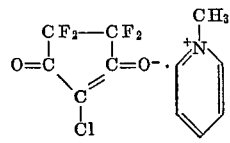

A solution of 24.0 parts of 1-chloro-2-methoxyhexafluoro-1-cyclopentene and 15.8 parts of pyridine in 200 parts of diglyme was allowed to stand at room temperature for eight days. The solvent and excess reagents were removed by distillation in vacuo. The residue was stirred into water and the resulting solution was filtered. The filtrate was evaporated to dryness to obtain 27.7 parts of the product of Example 29.

EXAMPLE 31

Various compounds of this invention were tested for antifungal activity by a standard agar dilution streak plate assay. According to the procedure, the products are incorporated in an agar-nutrient medium at several concentrations and the test organism is streaked across the surface of each agar sample in a Petri dish. The plates are incubated at 28° C. for 4 days. The minimum concentration of the product required for complete inhibition of growth of the organism is noted and recorded as "minimal inhibitory concentration in mcg./ml." The results are shown in the table below as minimal inhibitory concentrations in mcg. per ml.

|  | Fungi | | |
| --- | --- | --- | --- |
|  | T.m. | M.g. | C.g. |
| Product of Example 1 | [1] 125, 62 | [2] | [2] |
| Product of Example 5 | 250 | [1] 250 | [1] 250, 62 |
| Product of Example 6 | 250 | 250 | [1] 250 |
| Product of Example 7 | 125 | [2] | 125 |
| Product of Example 8 | 125 | 125 | [1] 125 |
| Product of Example 15 | [1] 125, 62 | [1] 250, 125 | [1] 125 |

[1] Partial inhibition.
[2] Inactivity at highest test level, 250 mcg./ml.
T.m.—Trichopyton mentagrophytes.
M.g.—Microsporum gypseum.
C.g.—Chaetomium globosum.

EXAMPLE 32

An aqueous solution of 6.25% of dimethylol ethylene urea and 10% of the product of Example 4 based on the resin solids was applied to 80 x 80 cotton percale by the standard padding procedure. A wet pickup of 80% caused 5% of the resin to be applied to the fabric. The fabric was dried at 225° F. for 2 minutes and cured at 350° F. for 1.5 minutes.

The wrinkle recovery data was obtained by standard procedures of the American Association of Textile Chemists and Colorists.

The tensile strength was determined by standard A.S.T.M. procedures.

|  | Wrinkle Recovery [1] | | Tensile Strength, lb. |
| --- | --- | --- | --- |
|  | Wet | Dry |  |
| Treated fabric | 217 | 249 | 75 |
| Untreated fabric | 130 | 191 | 87 |

[1] Warp plus fill in degrees.

What is claimed is:
1. Compounds of the formula:

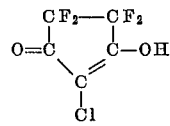

and the alkali metal, alkaline earth metal, zinc, amine and quaternary ammonium salts thereof.

2. 2-chloro-3-hydroxy-4,4,5,5 - tetrafluoro-2-cyclopenten-1-one.

3. 2-chloro-3-hydroxy-4,4,5,5,6,6 - hexafluoro-2-cyclohexene-1-one.

4. A process for preparing metal and quaternary ammonium salts of compounds of the formula

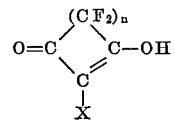

wherein X is selected from the group consisting of chlorine and fluorine and n is 1, 2 or 3, which comprises reacting a compound of the formula

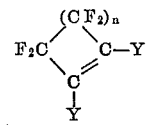

wherein X is selected from the group consisting of chlorine and fluorine, Y is selected from the group consisting of chlorine, fluorine, aryloxy and lower alkoxy, and n is 1, 2 or 3, with a compound selected from the group consisting of an alkali metal hydroxide, alkaline earth metal hydroxide or quaternary ammonium hydroxide in a solvent selected from the group consisting of dimethylformamide, dimethyl sulfoxide, dimethyl ether of diethylene glycol, and diethyl ether of ethylene glycol.

5. A process for preparing the dimethylammonium salts of compounds of the formula

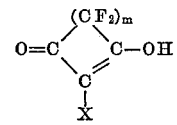

wherein X is selected from the group consisting of chlorine and fluorine and m is 1, 2 or 3, which comprises reacting a compound of the formula

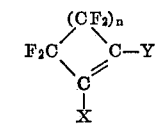

wherein X is selected from the group consisting of chlorine and fluorine, Y is selected from the group consisting of chlorine, fluorine, aryloxy and lower alkoxy, and n is 1, 2 or 3, and dimethylformamide at elevated temperature of at least 100° C. in the presence of a hydrogen halide or halide salt capable of liberating hydrogen halide.

6. Quaternary ammonium salts of the formula:

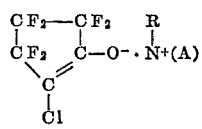

wherein R is a linear lower alkyl group and N(A) is selected from the group consisting of trialkyl amine, in which the alkyl may be substituted by hydroxy, alkoxy or acyloxy, pyridinium and quinolinium.

7. 1-chloro-2-hydroxy-3,3,4,4,5,5 - hexafluoro-1-cyclopentene, tetramethylammonium salt.

8. A process for preparing compound of the formula

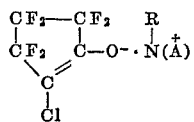

wherein R is a linear lower alkyl group and N(A) is selected from the group consisting of trialkyl amine, trialkyl amine substituted by a radical selected from the group consisting of hydroxy, alkoxy and quinoline, which comprises reacting at about 15° to 80° C. a 1-chloro-2-alkoxy-3,3,4,4,5,5-hexafluoro-1-cyclopentene with a tertiary alkylamine, a tertiary alkylamine in which the alkyl group is substituted by a radical selected from the group consisting of hydroxy and alkoxy and quinoline.

9. A process for preparing compounds of the formula

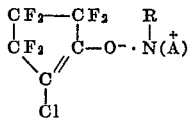

wherein R is a linear lower alkyl group and N(A) is selected from the group consisting of pyridine and isoquinoline which comprises reacting at about 15° to 80° C. a 1-chloro-2-alkoxy - 3,3,4,4,5,5 - hexafluoro-1-cyclopentene with a tertiary amine selected from the group consisting of pyridine and isoquinoline in the presence of at least five parts per part of amine of a solvent of moderate to low polarity.

10. A process for preparing quaternary ammonium salts of the formula

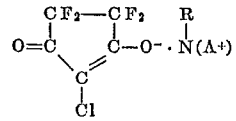

wherein R is a linear lower alkyl group and N(A) is selected from the group consisting of tri- loweralkylamine, in which alkyl may be substituted by hydroxy or alkoxy, pyridinium and quinolinium which comprises hydrolyzing a compound of the formula

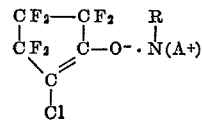

wherein R and N(A) are as defined above.

References Cited

UNITED STATES PATENTS

| | | | |
|---|---|---|---|
| 3,379,746 | 4/1968 | Weil | 260—429.9 |
| 3,390,176 | 6/1968 | Sweeney | 260—586 X |

ALEX MAZEL, Primary Examiner

D. G. DAUS, Assistant Examiner

U.S. Cl. X.R.

8—116.2, 116.3; 252—431; 260—286, 429.9, 586, 89.7, 297, 429.3, 429.5 429.7, 430, 431, 435, 438.1, 438.5, 439, 429, 583, 482, 290, 294.8, 289, 287, 295.5, 999

PO-1050
(5/69)

UNITED STATES PATENT OFFICE
CERTIFICATE OF CORRECTION

Patent No. 3,456,010      Dated January 23, 1970

Inventor(s) FREDERIC HOUGHTON, MICHAEL THOMAS BEACHEM and RICHARD FREDERICK STOCKEL It is certified that error appears in the above-identified patent and that said Letters Patent are hereby corrected as shown below:

Column 4, formula VII and VIII, cancel that portion of both formulas which reads:
$$\cdot \underset{|}{\overset{R}{N}} + (A)$$
and substitute:
$$\cdot \underset{|}{\overset{R}{N}}^{+} (A)$$

Column 5, line 38, cancel the term "markably" and substitute therefore --markedly--.

Column 5, line 41, cancel the word "believe" and substitute therefore --believed--.

Claim 6, cancel that portion of the formula which reads:
$$\cdot \underset{|}{\overset{R}{N}} + (A)$$
and substitute therefore:
$$\cdot \underset{|}{\overset{R}{N}}^{+} (A)$$

Claim 8, Column 15, line 23, insert --, acyloxy-- after the word "alkoxy".

Claim 8, Column 15, line 28, cancel the phrase "and alkoxy" and substitute therefore --, alkoxy and acyloxy,--.

Claim 10, Column 16, line 15, cancel the phrase "or alkoxy" and substitute therefore --, alkoxy or acyloxy,--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents